(12) United States Patent  
Carr

(10) Patent No.: US 8,607,680 B1
(45) Date of Patent: Dec. 17, 2013

(54) COMBINED DUAL BEVEL MITER AND RADIAL ARM SAW DEVICE

(76) Inventor: Steven Carr, Boonville, NY (US)

(*) Notice: Subject to any disclaimer, the term of this patent is extended or adjusted under 35 U.S.C. 154(b) by 134 days.

(21) Appl. No.: 13/424,774

(22) Filed: Mar. 20, 2012

(51) Int. Cl.
*B27B 5/20* (2006.01)
*B27B 5/00* (2006.01)

(52) U.S. Cl.
USPC .............. 83/486.1; 83/471.3; 83/478; 83/574

(58) Field of Classification Search
USPC ............... 83/574, 471.3, 477.1, 477.2, 486.1, 83/581; 30/388
See application file for complete search history.

(56) References Cited

U.S. PATENT DOCUMENTS

| | | | | |
|---|---|---|---|---|
| 1,748,446 A * | 2/1930 | Gatzsch | ........................ | 83/486.1 |
| 1,846,295 A * | 2/1932 | Wilderson | .................... | 83/486.1 |
| 1,846,641 A * | 2/1932 | Hedgpeth | ........................ | 83/574 |
| 1,866,888 A * | 7/1932 | Hawley | .......................... | 83/471.3 |
| 1,867,275 A * | 7/1932 | McCarter | ..................... | 83/486.1 |
| 2,120,897 A * | 6/1938 | Miller | .......................... | 83/486.1 |
| 2,422,843 A * | 6/1947 | Mooradian | .................. | 83/471.3 |
| 2,522,789 A * | 9/1950 | Johnson | .......................... | 83/478 |
| 2,627,880 A * | 2/1953 | Johnson | .......................... | 83/574 |
| 3,302,669 A * | 2/1967 | Edler | ............................ | 83/471.3 |
| 4,574,670 A * | 3/1986 | Johnson | .......................... | 83/409 |
| 5,121,554 A | 6/1992 | Havins | | |
| 5,287,779 A * | 2/1994 | Metzger, Jr. | ................. | 83/102.1 |
| 5,421,228 A * | 6/1995 | Fukinuki | ...................... | 83/471.3 |
| 5,816,129 A | 10/1998 | Singer | | |
| 5,931,073 A | 8/1999 | Hoyer-Ellefsen | | |
| 6,523,444 B2 * | 2/2003 | Keller | ............................ | 83/13 |
| 6,755,108 B2 * | 6/2004 | Shull et al. | ..................... | 83/588 |
| 6,782,783 B2 * | 8/2004 | Shull et al. | ..................... | 83/471.3 |
| 2006/0236834 A1 * | 10/2006 | Ange | ........................... | 83/471.3 |
| 2011/0067542 A1 | 3/2011 | Lacy | | |

* cited by examiner

*Primary Examiner* — Laura M Lee

(57) ABSTRACT

The combined dual bevel miter and radial arm saw device provides the advantages of both a radial arm saw and a miter saw. The device thereby provides for cross cuts, rip cuts and angle cuts, all simultaneously if desired.

9 Claims, 4 Drawing Sheets

COMBINED DUAL BEVEL MITER AND RADIAL ARM SAW DEVICE

BACKGROUND OF THE INVENTION

Most woodworkers have used both radial arm saws and miter saws. Yet heretofore, these saws have required separate purchase and use. The present device solves this problem.

FIELD OF THE INVENTION

The combined dual bevel miter and radial arm saw device relates to radial saws and miter saws and more especially to a combination of the two types of saws.

SUMMARY OF THE INVENTION

The general purpose of the combined dual bevel miter and radial arm saw device described subsequently in greater detail, is to provide a combined dual bevel miter and radial arm saw device which has many novel features that result in an improved combined dual bevel miter and radial arm saw device which is not anticipated, rendered obvious, suggested, or even implied by prior art, either alone or in combination thereof.

To attain this, the combined dual bevel miter and radial arm saw device partially comprises a base having a front spaced apart from a rear and a first side spaced apart from a second side. A slideable fence is disposed atop the base. A first pedestal is disposed rearwardly and upwardly atop the base. A first pivot is disposed atop the first pedestal. A second pedestal is disposed atop the first pivot. The second pedestal may be concentric with the first pedestal. A circular slide arm is slideably disposed horizontally through the second circular pedestal. A stop is disposed rearwardly on the circular slide arm, thus preventing inadvertent passage of the slide arm through and out of the second circular pedestal. A slide lock is disposed within the second pedestal. The slide lock is in communication with the slide arm. The slide lock is configured to rearwardly and forwardly locate the slide arm within the second pedestal.

The indexing lock is disposed within the second circular pedestal, the indexing lock configured to rotationally locate the slide arm within the second circular pedestal. The upright is affixed medially and perpendicularly upward on the slide arm, with the horizontal arm disposed upwardly and perpendicularly on the upright. The rotation lock is disposed within the horizontal arm rectangular section. The saw disposed pivotally and downwardly from the rectangular section. The rotation lock allows user-determined rotated positioning of the saw.

Thus has been broadly outlined the more important features of the improved combined dual bevel miter and radial arm saw device so that the detailed description thereof that follows may be better understood and in order that the present contribution to the art may be better appreciated.

An object of the combined dual bevel miter and radial arm saw device is to provide the advantages of a miter saw and a radial saw.

Another object of the combined dual bevel miter and radial arm saw device is to enable rip cuts, cross cuts, and angle cuts within the same saw.

These together with additional objects, features and advantages of the improved combined dual bevel miter and radial arm saw device will be readily apparent to those of ordinary skill in the art upon reading the following detailed description of presently preferred, but nonetheless illustrative, embodiments of the improved combined dual bevel miter and radial arm saw device when taken in conjunction with the accompanying drawings.

DETAILED DESCRIPTION OF THE DRAWINGS

With reference now to the drawings, and in particular FIGS. 1 through 4 thereof, the principles and concepts of the combined dual bevel miter and radial arm saw device generally designated by the reference number 10 will be described.

Figure 1:
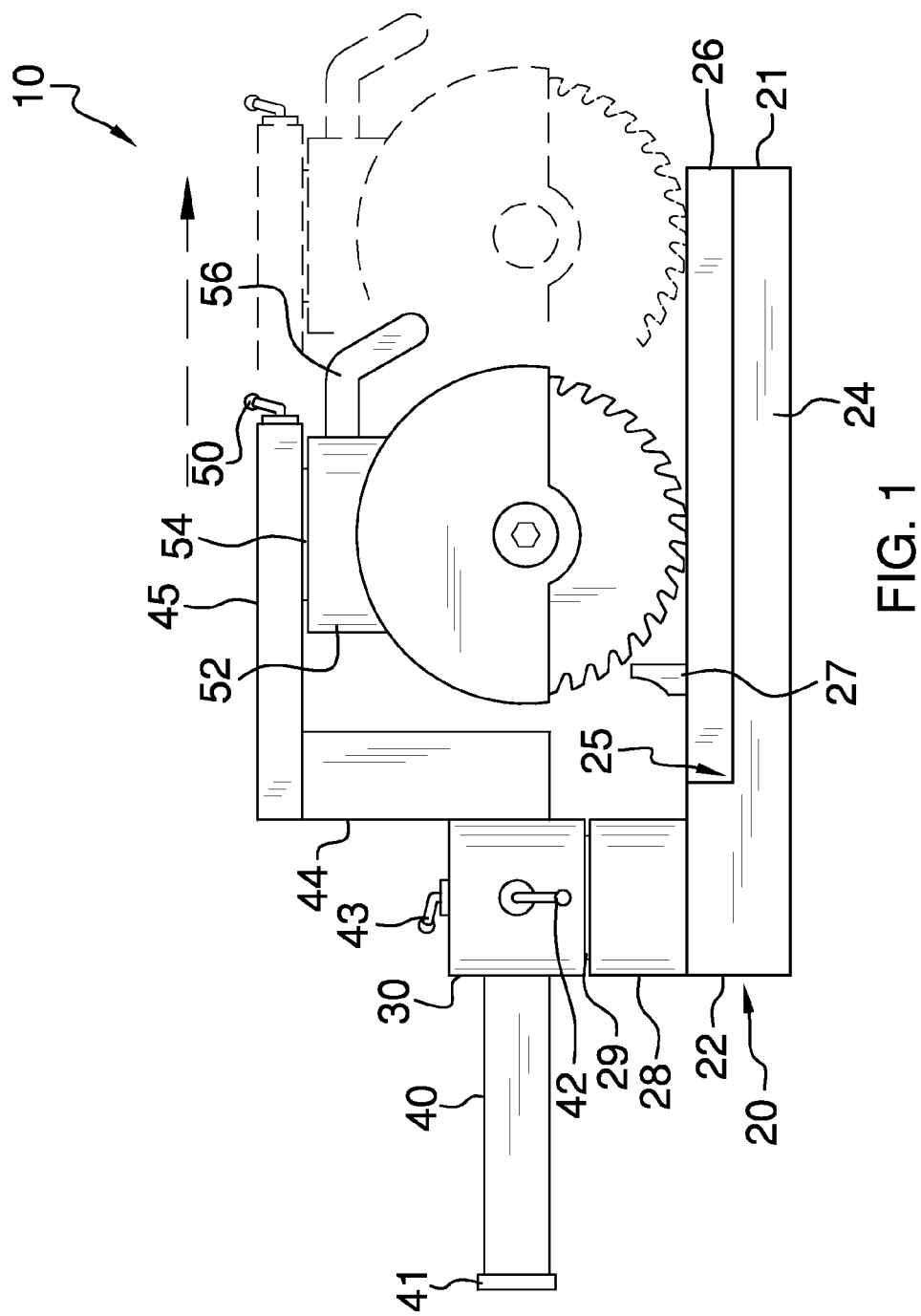
FIG. 1 is a lateral elevation view.

Referring to FIG. 1, the device 10 partially comprises an L-shaped base 20 having a front 21 spaced apart from a rear 22, a first side 23 spaced apart from a second side 24, and an upwardly disposed recess 25. A removable work surface 26 is disposed within the recess 25. The work surface 26 can thereby be replaced. The work surface 26 is configured to be upwardly coplanar with the L-shaped base 20.

Referring to FIG. 4 and again to FIG. 1, a slideable fence 27 is removably disposed atop the work surface 26. A first circular pedestal 28 is disposed rearwardly and upwardly atop the L-shaped base 20. A bearinged first pivot 29 is disposed atop the first circular pedestal 28.

A second circular pedestal 30 is disposed atop the first pivot 29. The first circular pedestal 28 and the second circular pedestal 30 are concentrically disposed. A slide arm 40 is slideably disposed horizontally through the second circular pedestal 30. A stop 41 is disposed rearwardly on the slide arm 40. A slide lock 42 is disposed within the second circular pedestal 30. The slide lock 42 is in communication with the slide arm 40. The slide lock 42 is configured to rearwardly and forwardly locate the slide arm 40 within the second circular pedestal 30. An indexing lock 43 is disposed within the second circular pedestal 30. The indexing lock 43 is configured to rotationally locate the slide arm 40 within the second circular pedestal 30. An upright 44 is affixed medially and perpendicularly upward from the slide arm 40. A horizontal arm 45 is disposed medially and perpendicularly on the upright 44. The horizontal arm 45 further comprises an outwardly and medially disposed tapered section 46 having a rectangular section 47 disposed most medially.

Figure 2:
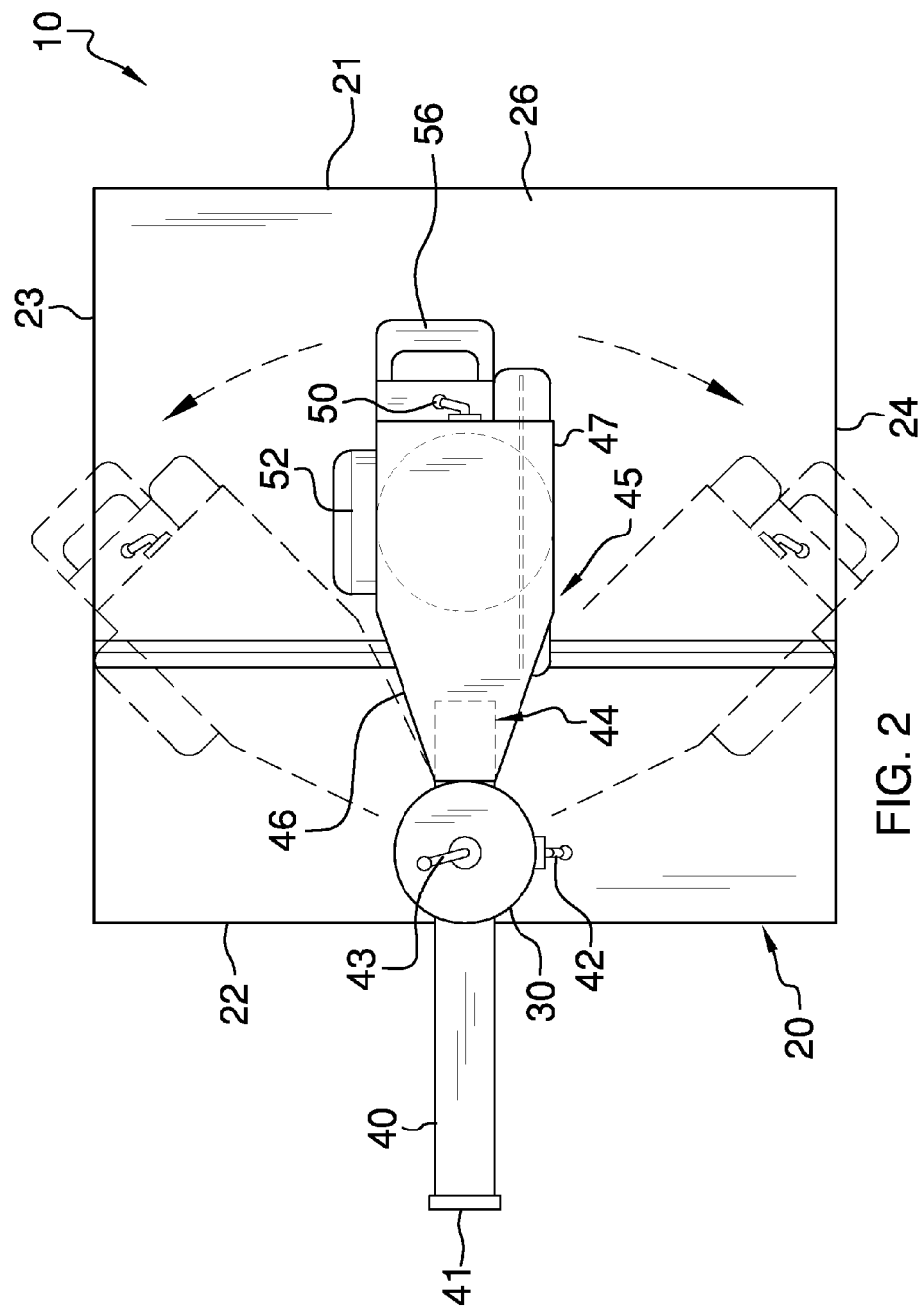
FIG. 2 is a top plan view.

Referring to FIG. 2, a rotation lock 50 is disposed within the horizontal arm 45 rectangular section 47.

Figure 3:
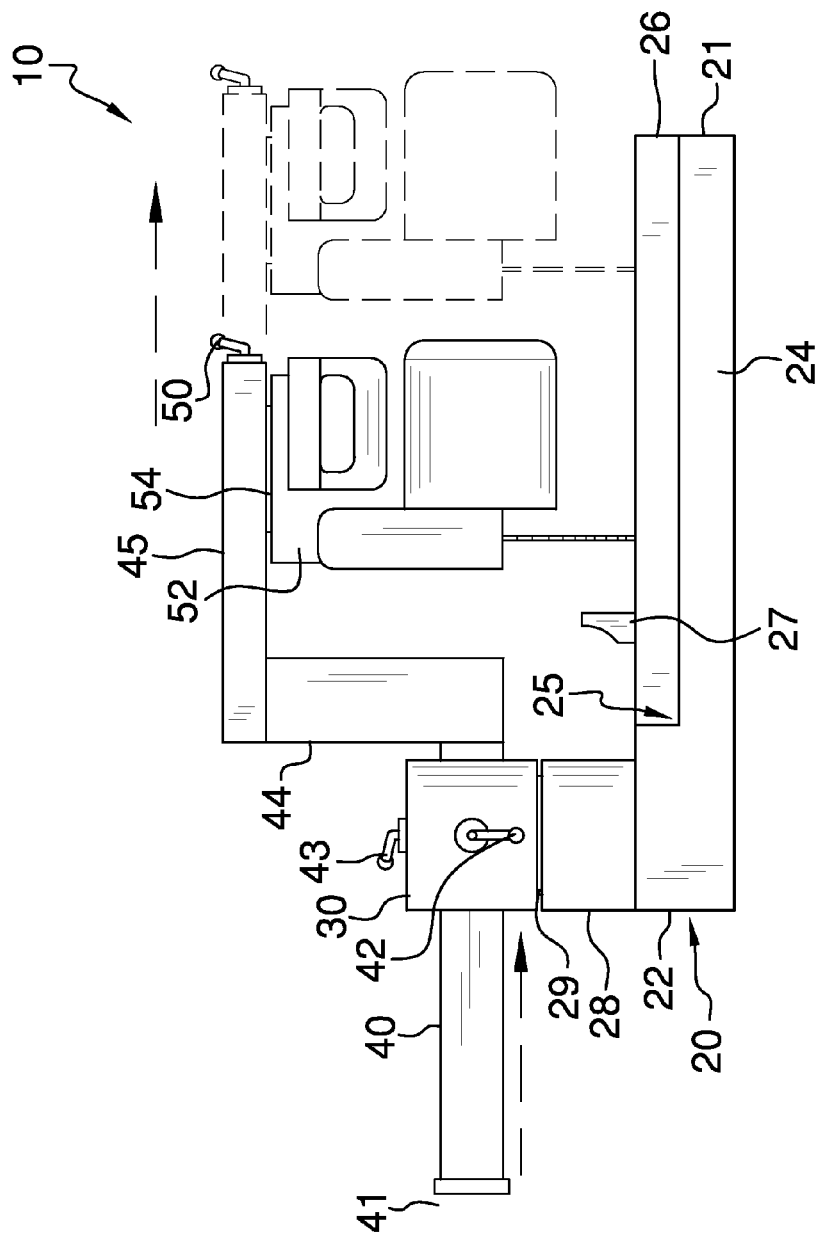
FIG. 3 is a lateral elevation view.
Figure 4:
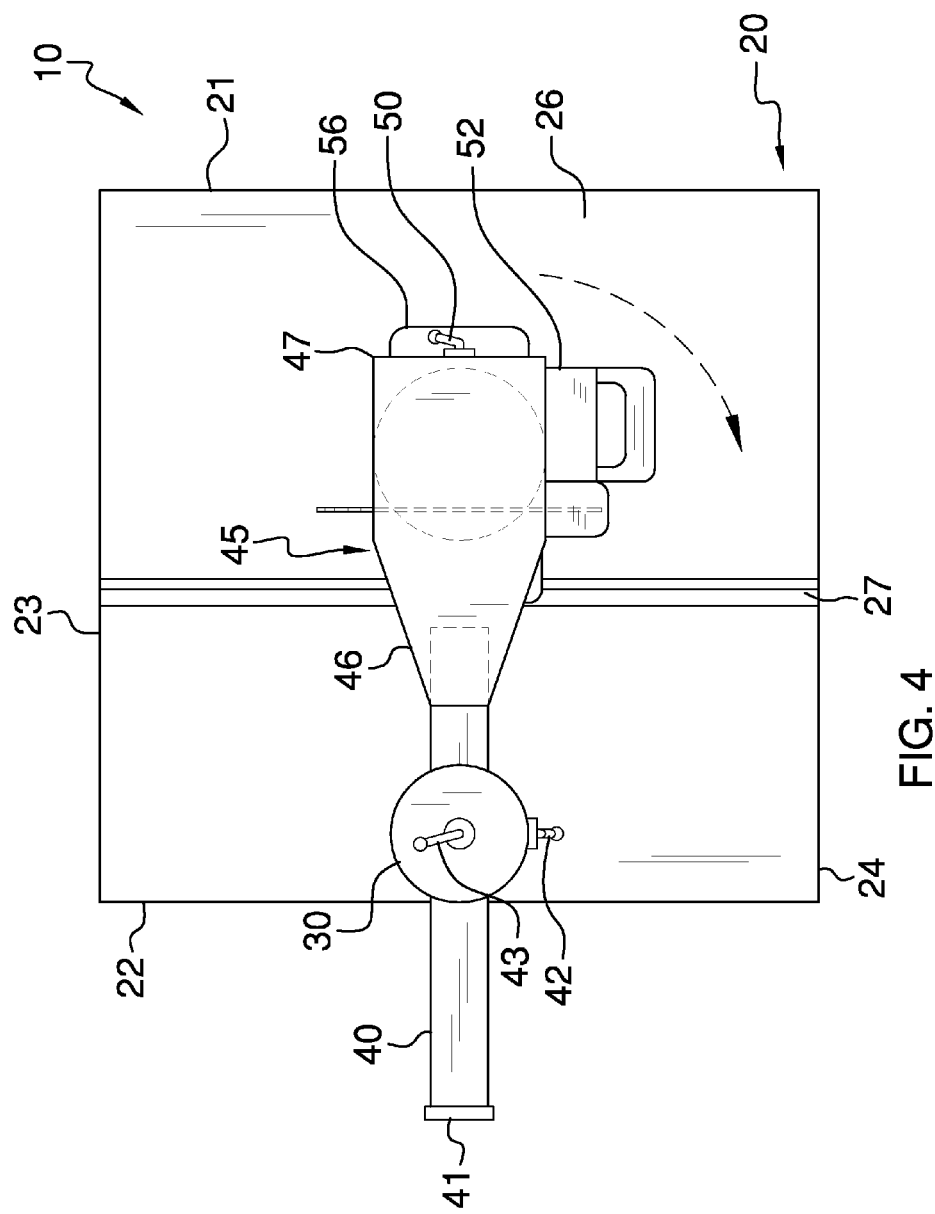
FIG. 4 is a top plan view.

Referring to FIG. 3, a saw 52 is disposed pivotally and downwardly from the rectangular section 47. A second bearinged pivot 54 is disposed between the saw 52 and the rectangular section 47.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the combined dual bevel miter and radial arm saw device may be used.

What is claimed is:
1. A combined dual bevel miter and radial arm saw device comprising, in combination:
   a base having a front spaced apart from a rear and a first side spaced apart from a second side;
   a slideable fence disposed atop the base;

a first pedestal disposed rearwardly and upwardly atop the base;

a first pivot disposed atop the first pedestal;

a second pedestal disposed atop the first pivot, the second pedestal concentric with the first pedestal;

a circular slide arm slideably disposed horizontally through the second pedestal;

a stop disposed rearwardly on the circular slide arm;

a slide lock disposed within the second pedestal, the slide lock in communication with the slide arm, the slide lock configured to rearwardly and forwardly locate the slide arm within the second pedestal;

an indexing lock disposed within the second pedestal, the indexing lock configured to rotationally locate the slide arm within the second pedestal;

an upright affixed perpendicularly upward from the slide arm;

a horizontal arm perpendicularly disposed on the upright, the horizontal arm having a rectangular section with a bottom surface; a rotation lock disposed within the horizontal arm rectangular section; a saw pivotally mounted on the bottom surface of the rectangular section, the saw thereby pivotally positioned under the rectangular section and above the work surface, the rotation lock configured to rotationally position the saw.

2. The device according to claim 1 wherein the first pivot and the second pivot comprise bearings.

3. The device according to claim 1 wherein the first pedestal and the second pedestal are circular.

4. The device according to claim 2 wherein the first pedestal and the second pedestal are circular.

5. The device according to claim 1 wherein the slidable fence is removable.

6. The device according to claim 2 wherein the slidable fence is removable.

7. The device according to claim 3 wherein the slidable fence is removable.

8. The device according to claim 4 wherein the slidable fence is removable.

9. A combined dual bevel miter and radial arm saw device comprising, in combination:

an L-shaped base having a front spaced apart from a rear, a first side spaced apart from a second side, and an upwardly disposed recess;

a removable work surface disposed within the recess, the work surface configured to be upwardly coplanar with the L-shaped base;

a slideable fence removably disposed atop the work surface;

a first circular pedestal disposed rearwardly and upwardly atop the L-shaped base;

a bearinged first pivot disposed atop the first circular pedestal;

a second circular pedestal disposed atop the first pivot, the first circular pedestal and the second circular pedestal concentrically disposed;

a slide arm slideably disposed horizontally through the second circular pedestal;

a stop disposed rearwardly on the slide arm;

a slide lock disposed within the second circular pedestal, the slide lock in communication with the slide arm, the slide lock configured to rearwardly and forwardly locate the slide arm within the second circular pedestal;

an indexing lock disposed within the second circular pedestal, the indexing lock configured to rotationally locate the slide arm within the second circular pedestal;

an upright affixed perpendicularly to and upward from the slide arm; a horizontal arm disposed horizontally and perpendicularly on the upright, the horizontal arm further comprising an outwardly tapered section and a rectangular section with a bottom surface; a saw pivotally mounted on the bottom surface of the rectangular section; a second bearinged pivot disposed between the saw and the rectangular section; a rotation lock disposed within the horizontal arm rectangular section, the saw thereby positioned under the rectangular section and above the work surface, the rotation lock configured to pivotally and selectively position the saw.

\* \* \* \* \*